(12) United States Patent
Szczerba et al.

(10) Patent No.: US 11,890,932 B2
(45) Date of Patent: Feb. 6, 2024

(54) TRANSFORMABLE KNOB FOR A VEHICLE

(71) Applicant: GM Global Technology Operations LLC, Detroit, MI (US)

(72) Inventors: Joseph F. Szczerba, Grand Blanc, MI (US); Ki Hyun Ahn, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 344 days.

(21) Appl. No.: 17/518,238

(22) Filed: Nov. 3, 2021

(65) Prior Publication Data

US 2023/0135972 A1    May 4, 2023

(51) Int. Cl.
*B60K 35/00* (2006.01)

(52) U.S. Cl.
CPC ........ *B60K 35/00* (2013.01); *B60K 2370/122* (2019.05); *B60K 2370/126* (2019.05); *B60K 2370/774* (2019.05)

(58) Field of Classification Search
CPC ............... B60K 2370/774; B60K 2370/122
See application file for complete search history.

(56) References Cited

U.S. PATENT DOCUMENTS

| 5,988,496 A * | 11/1999 | Bruna | A61M 15/0068 222/18 |
| 7,004,164 B2 * | 2/2006 | Scarrott | A61M 15/009 128/200.23 |
| 8,181,591 B1 * | 5/2012 | Gulka | A61M 15/0073 128/200.14 |

FOREIGN PATENT DOCUMENTS

| DE | 102004021097 A1 | 12/2005 |
| DE | 112004001937 | 11/2006 |
| DE | 102007004250 A1 | 8/2007 |
| DE | 102015011196 A1 | 3/2016 |
| EP | 1524578 A1 | 4/2005 |

* cited by examiner

*Primary Examiner* — Vicky A Johnson
(74) *Attorney, Agent, or Firm* — Vivacqua Crane PLLC

(57) ABSTRACT

A transformable knob for a vehicle comprises an axle extending along an axis and a body mounted to the axle and rotatable about the axis. The body comprises a face plate and a periphery wall defining a cavity, and with the periphery wall arranged to flex relative to the axis. The transformable knob comprises a plurality of engagement arms disposed within the cavity and movable toward and away from the axis, with the plurality of engagement arms configured to selectively engage and flex the periphery wall between first and second configurations. The transformable knob comprises an actuator in engagement with the plurality of engagement arms and arranged to move between first and second positions, with movement of the actuator facilitating corresponding movement of the plurality of engagement arms to flex the periphery wall between the first and second configurations, respectively.

20 Claims, 12 Drawing Sheets

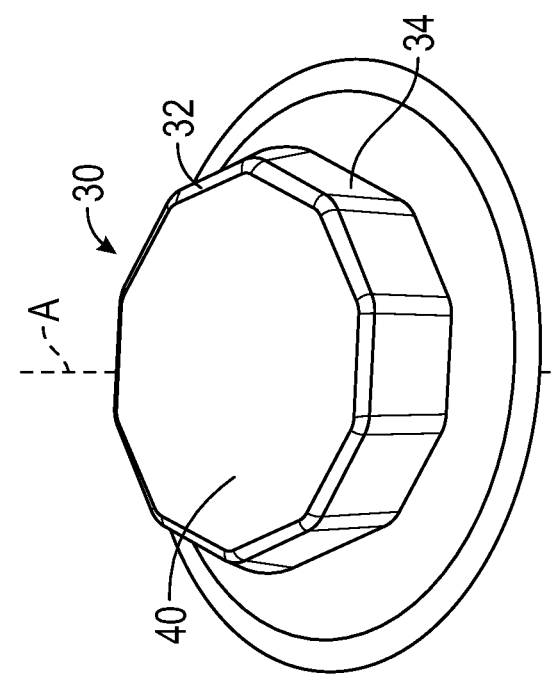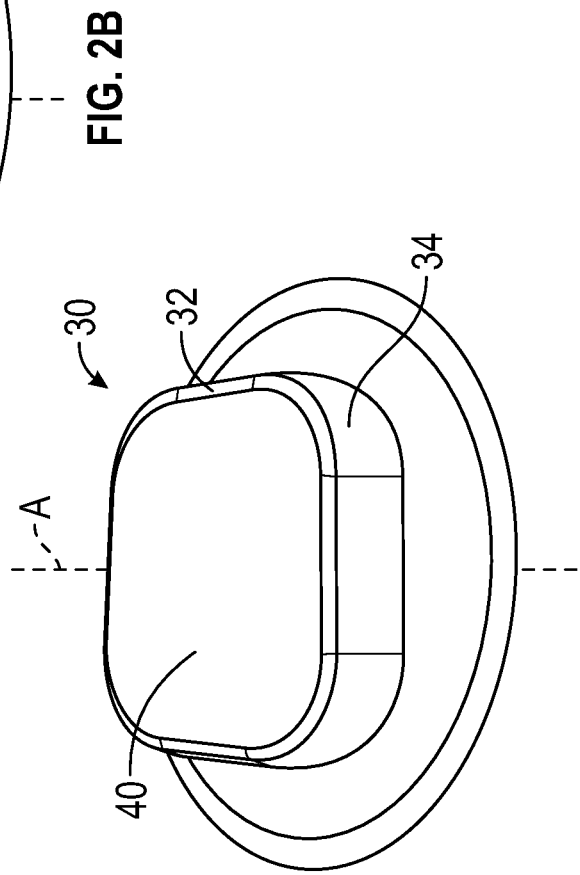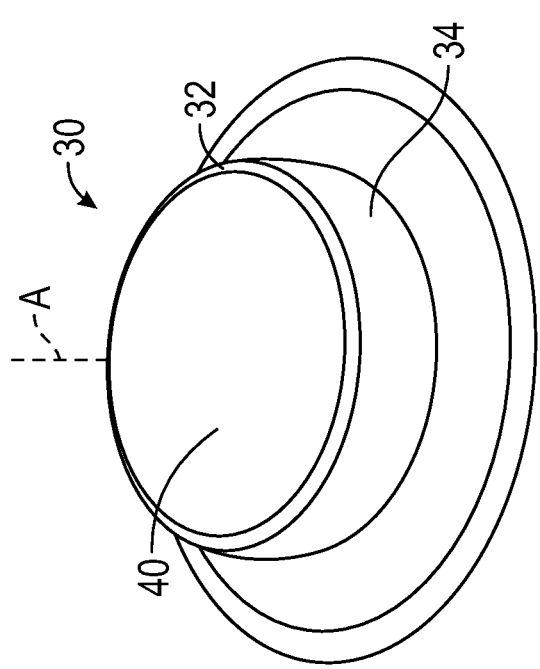

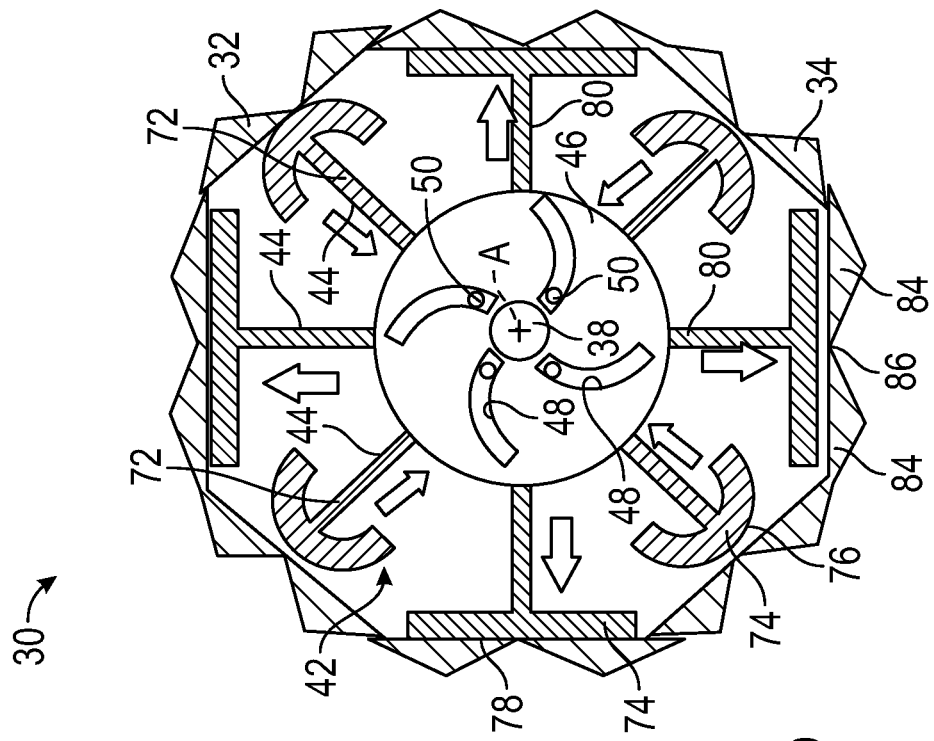
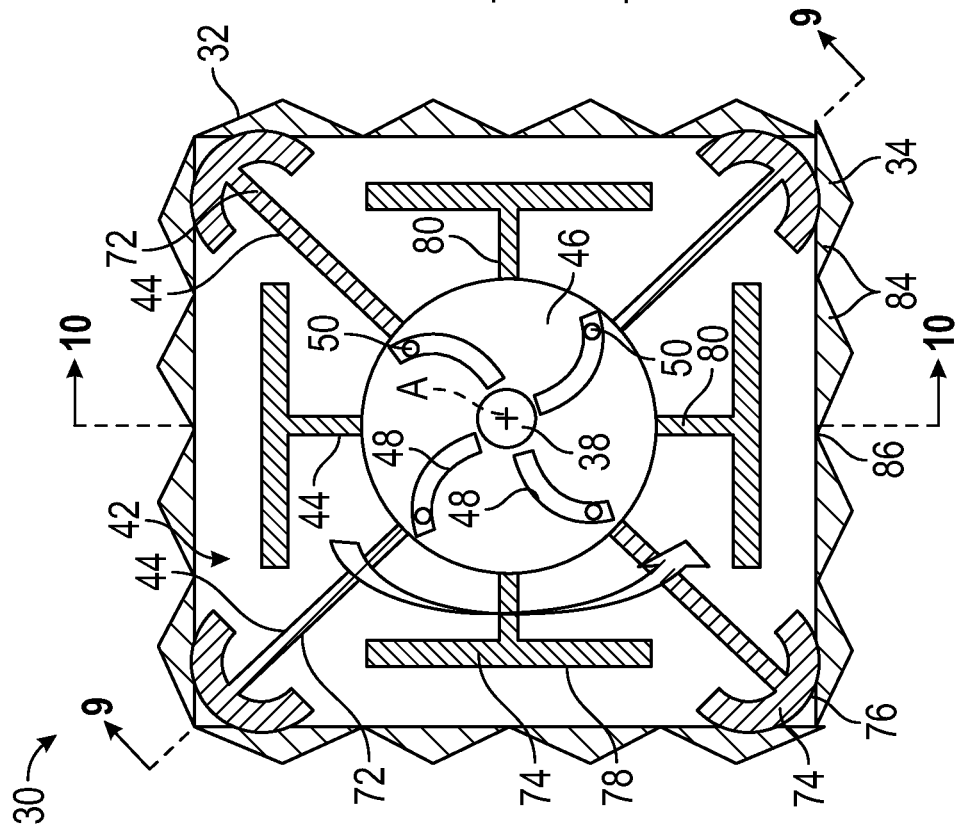

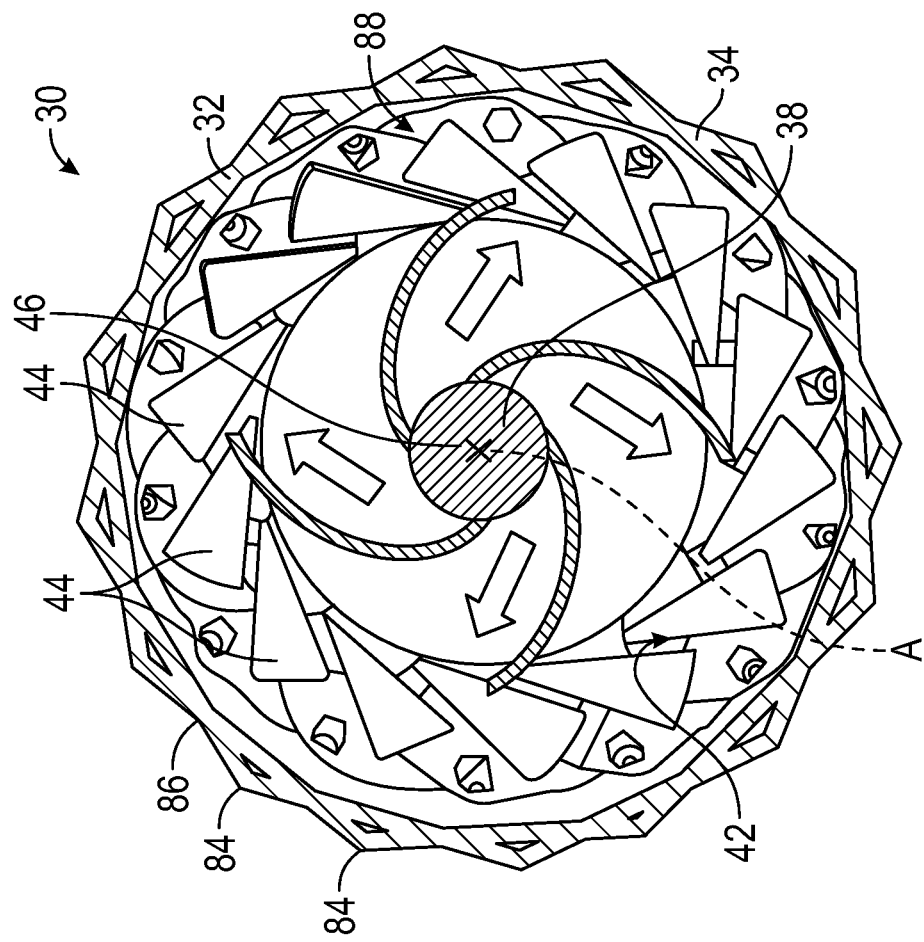
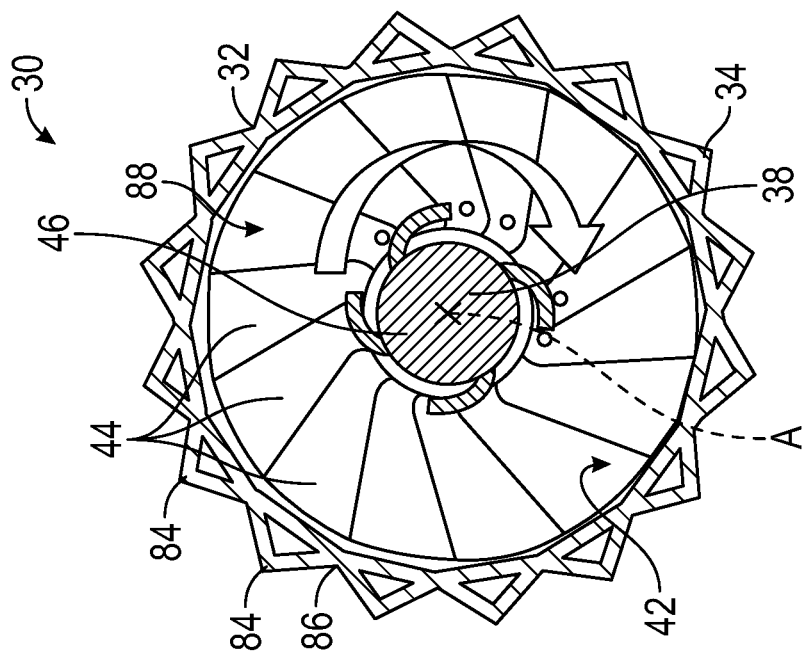
FIG. 11B
FIG. 11A

TRANSFORMABLE KNOB FOR A VEHICLE

INTRODUCTION

The present disclosure relates to a transformable knob, and more particularly to a transformable knob for a vehicle.

In recent years, electronic systems have been utilized to a larger degree in automobiles to perform various functions that were traditionally performed by mechanical systems. One area in particular that has greatly reduced mechanical systems in favor of electronic systems is control systems. More specifically, buttons, levers, and knobs that were once utilized to control systems such as the radio, HVAC, and transmission have been reduced in favor of touchscreen displays. The touchscreen displays follow a minimalist design style but maintain the functionality of traditional control systems. While useful, touchscreen displays provide limited (if any) tactile feedback to the operator when a selection is made. The operator often must avert their attention from the road to the display to make a selection and/or confirm that the proper selection has been made. In doing so, the operator is increasing the chance of getting into an accident.

Thus, while current control systems achieve their intended purpose, there is a need for a new transformable knob for a vehicle that addresses these issues.

SUMMARY

According to several aspects of the present disclosure, a transformable knob for a vehicle comprises an axle extending along an axis and a body mounted to the axle and rotatable about the axis. The body comprises a face plate and a periphery wall coupled to the face plate and extending around the axis, with the face plate and the periphery wall defining a cavity, and with the periphery wall arranged to flex relative to the axis. The transformable knob further comprises a plurality of engagement arms disposed within the cavity and movable toward and away from the axis, with the plurality of engagement arms configured to selectively engage and flex the periphery wall between a first configuration and a second configuration. The transformable knob further comprises an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively.

In one aspect, the actuator extends along a first plane orthogonal to the axis and defines a first track extending in a curved radial configuration from the axis. The plurality of engagement arms comprise a first post disposed in the first track. The rotation of the actuator moves the first post within the first track and correspondingly moves the plurality of engagement arms between the first and second positions.

In another aspect, the transformable knob further comprises a guide plate extending along a second plane parallel to the first plane, with the plurality of engagement arms disposed between the actuator and the guide plate. The guide plate defines a second track extending in a straight radial configuration from the axis. The plurality of engagement arms comprise a second post disposed in the second track. The guide plate is stationary as the actuator moves the engagement arms between the first and second positions to guide the movement of the engagement arms in linearly towards and away from the axis.

In another aspect, the guide plate is fixed to the body and the guide plate retains the rotational position of the engagement arms relative to the body as the actuator moves the engagement arms between the first and second positions In another aspect, the transformable knob further comprises a sleeve fixed to the actuator and rotatably coupled to the body, with the sleeve extending along the axis and with the sleeve surrounding the axle and defining a sleeve track having a helical configuration. The axle comprises a protrusion extending outwardly from the axis and in engagement with the sleeve track with linear movement of the body along the axis causing the protrusion to move along the sleeve track and rotate the sleeve to move the actuator between the first and second positions.

In another aspect, the transformable knob further comprises an electric motor coupled to the axle and configured to rotate the axle about the axis, and with the axle fixed to the actuator. Rotation of the axle by the electric motor moves the actuator between the first and second positions.

In another aspect, the guide plate is fixed relative to the axis and retains the rotational position of the engagement arms as the body rotates about the axis.

In another aspect, the actuator is fixed to the body such that rotation of the body about the axis correspondingly moves the actuator between the first and second positions.

In another aspect, the movement of the plurality of engagement arms to flex the periphery wall between the first and second configurations is further defined as uniformly moving the plurality of engagement arms outwardly away from the axis to flex the periphery wall and increase the size of the body from the first configuration to the second configuration.

In another aspect, the movement of the plurality of engagement arms to flex the periphery wall between the first and second configurations is further defined as moving a portion of the plurality of engagement arms toward or away from the axis to flex the periphery wall and change a shape of the body from the first configuration to the second configuration.

In another aspect, the plurality of engagement arms are configured as plurality of plungers each individually engaging a portion of the periphery wall.

In another aspect, each of the plungers comprise a head having a curved surface configured to engage the respective portion of the periphery wall.

In another aspect, the actuator is further defined as a first actuator and the plurality of plungers are further defined as a first plurality of plungers. The transformable knob further comprises a second plurality of plungers and a second actuator in engagement with the second plurality of plungers, with the second actuator configured to move the second plurality of plungers independent of the first actuator and the first plurality of plungers to change the shape of the body between the first and second configurations.

In another aspect, the periphery wall comprises a plurality of knurls arranged end-to-end and a plurality of hinges individually disposed between the knurls. Flexing the periphery wall comprises folding the knurls about the hinges.

In another aspect, the periphery wall comprises an elastomeric material such that flexing the periphery wall comprises bending the elastomeric material of the periphery wall.

In another aspect, flexing the periphery wall comprises stretching the elastomeric material of the periphery wall.

In another aspect, the plurality of engagement arms are substantially flat and overlap one another about the axis such that the engagement arms collectively engage the periphery wall entirely around the axis.

In another aspect, the plurality of engagement arms are configured as a mechanical iris.

According to several aspects of the present disclosure, a transformable knob for a vehicle comprises an axle extending along an axis and a body mounted to the axle and rotatable about the axis. The body comprises a face plate and a periphery wall coupled to the face plate and extending around the axis, with the face plate and the periphery wall defining a cavity, and with the periphery wall arranged to flex relative to the axis. The transformable knob further comprises a plurality of engagement arms disposed within the cavity and movable toward and away from the axis, with the plurality of engagement arms configured to selectively engage and flex the periphery wall between a first configuration and a second configuration. The transformable knob further comprises an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively. The transformable knob further comprises a guide plate. The actuator extends along a first plane orthogonal to the axis and defines a first track extending in a curved radial configuration from the axis. The plurality of engagement arms comprise a first post disposed in the first track. Rotation of actuator moves the first post within the first track and correspondingly moves the plurality of engagement arms between the first and second positions. The guide plate extends along a second plane parallel to the first plane, with the plurality of engagement arms disposed between the actuator and the guide plate. The guide plate defines a second track extending in a straight radial configuration from the axis. The plurality of engagement arms comprise a second post disposed in the second track. The guide plate is stationary as the actuator moves the engagement arms between the first and second positions to guide the movement of the engagement arms in linearly towards and away from the axis. The guide plate is fixed relative to the axis and retains the rotational position of the engagement arms as the body rotates about the axis. The actuator is fixed to the body such that rotation of the body about the axis correspondingly moves the actuator between the first and second positions. The plurality of engagement arms are configured as plurality of plungers each individually engaging a portion of the periphery wall. The actuator is further defined as a first actuator and the plurality of plungers are further defined as a first plurality of plungers. The transformable knob further comprises a second plurality of plungers and a second actuator in engagement with the second plurality of plungers, with the second actuator configured to move the second plurality of plungers independent of the first actuator and the first plurality of plungers to change the shape of the body between the first and second configurations.

According to several aspects of the present disclosure, a transformable knob for a vehicle comprises an axle extending along an axis and a body mounted to the axle and rotatable about the axis. The body comprises a face plate and a periphery wall coupled to the face plate and extending around the axis, with the face plate and the periphery wall defining a cavity, and with the periphery wall arranged to flex relative to the axis. The transformable knob further comprises a plurality of engagement arms disposed within the cavity and movable toward and away from the axis, with the plurality of engagement arms configured to selectively engage and flex the periphery wall between a first configuration and a second configuration. The transformable knob further comprises an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively. The transformable knob further comprises a guide plate and an electric motor coupled to the axle and configured to rotate the axle about the axis. The plurality of engagement arms are configured as plurality of plungers each individually engaging a portion of the periphery wall. The actuator extends along a first plane orthogonal to the axis and defines a first track extending in a curved radial configuration from the axis. The plurality of engagement arms comprise a first post disposed in the first track. Rotation of actuator moves the first post within the first track and correspondingly moves the plurality of engagement arms between the first and second positions. The guide plate extends along a second plane parallel to the first plane, with the plurality of engagement arms disposed between the actuator and the guide plate. The guide plate defines a second track extending in a straight radial configuration from the axis. The plurality of engagement arms comprise a second post disposed in the second track. The guide plate is stationary as the actuator moves the engagement arms between the first and second positions to guide the movement of the engagement arms in linearly towards and away from the axis. The guide plate is fixed to the body and the guide plate retains the rotational position of the engagement arms relative to the body as the actuator moves the engagement arms between the first and second positions. The axle is fixed to the actuator. Rotation of the axle by the electric motor moves the actuator between the first and second positions.

According to several aspects of the present disclosure, a control system for a vehicle comprises a controller comprising at least one processor and at least one non-transitory computer-readable medium including instructions. The control system further comprises a transformable knob configured to be manipulated by an operator between a first state and a second state and in electronic communication with the controller, with the transformable knob comprising a body having a periphery wall arranged to flex between a first configuration corresponding to the first state and a second configuration corresponding to the second state. The control system further comprises an output device in electronic communication with the controller and arranged to change between a first setting and a second setting. Manipulation of the transformable knob by the operator from the first state to the second state transmits an input signal to the controller and facilitates flexing of the periphery wall from the first configuration to the second configuration. The controller is configured to receive the input signal and the processor is programmed to compare the input signal to the instructions in the at least one non-transitory computer-readable medium and transmit an output signal to the output device to change the output device from the first setting to the second setting.

In one aspect, flexing the periphery wall between the first and second configurations is further defined as uniformly flexing the periphery wall and increasing the size of the body from the first configuration to the second configuration.

In another aspect, flexing the periphery wall between the first and second configurations is further defined as flexing the periphery wall and changing a shape of the body from the first configuration to the second configuration.

In another aspect, the manipulation of the transformable knob by the operator from the first state to the second state is further defined as rotation of the body of the transformable knob about an axis from the first state to the second state.

In another aspect, the manipulation of the transformable knob by the operator from the first state to the second state is further defined as linear movement of the body of the transformable knob about along axis from the first state to the second state.

In another aspect, the transformable knob comprises an actuator coupled to the body and movable between a first position and a second position, with the manipulation of the transformable knob by the operator from the first state to the second state further defined as movement of the body by the operator from the first state to the second state causing corresponding movement of the actuator from the first position to the second position to flex the periphery wall from the first configuration to the second configuration.

In another aspect, the transformable knob comprises an actuator movable between a first position and a second position, and an electric motor coupled to the actuator and in electronic communication with the controller, with the processor further programmed to transmit a configuration signal to the electric motor to move the actuator from the first position to the second position and flex the periphery wall from the first configuration to the second configuration.

In another aspect, the output device comprises a display surface arranged to show a first indicia and a second indicia, with the display surface showing the first indicia in the first setting and the second indicia in the second setting.

In another aspect, the output device further comprises a ride control module configured to change dynamics of the vehicle between a first ride mode and a second ride mode, with the first ride mode corresponding to the first setting and the second ride mode corresponding to the second setting.

In another aspect, the output device further comprises a cabin comfort module configured to change an environment within the vehicle between a first comfort mode and a second comfort mode, with the first comfort mode corresponding to the first setting and a second comfort mode corresponding to the second setting.

According to several aspects of the present disclosure, a method of operating a control system for a vehicle is presented. The control system comprises a controller comprising at least one processor and at least one non-transitory computer-readable medium including instructions, a transformable knob in electronic communication with the controller, with the transformable knob comprising a body having a periphery wall arranged to flex, and an output device in electronic communication with the controller. The method comprises performing a manipulation of the transformable knob with an operator from a first state to a second state, transmitting an input signal from the transformable knob to the controller, receiving the input signal with the controller, and comparing the input signal with the processor to the instructions in the at least one non-transitory computer-readable medium. The method further comprises transmitting an output signal from the controller to the output device, changing the output device from a first setting to a second setting, and flexing the periphery wall of the transformable knob from a first configuration corresponding to the first state to a second configuration corresponding to the second state.

In one aspect, performing a manipulation of the transformable knob with the operator from a first state to a second state is further defined as performing a primary manipulation of the transformable knob with the operator from the first state to the second state. The method further comprises performing a secondary manipulation of the transformable knob with the operator from a first sub-state of the second state to a second sub-state of the second state, transmitting a secondary input signal from the transformable knob to the controller, and receiving the secondary input signal with the controller. The method further comprises comparing the secondary input signal with the processor to the instructions in the at least one non-transitory computer-readable medium, transmitting a secondary output signal from the controller to the output device, and changing the output device from a first sub-setting of the second setting to a second sub-setting of the second setting.

In another aspect, performing the primary manipulation of the transformable knob with the operator from the first state to the second state is further defined as performing a linear movement of the body of the transformable knob along an axis with the operator from the first state to the second state and wherein performing the secondary manipulation of the transformable knob with the operator from the first sub-state of the second state to the second sub-state of the second state is further defined as rotating the body of the transformable knob about the axis with the operator from the first sub-state of the second state to the second sub-state of the second state.

In another aspect, performing the manipulation of the transformable knob with the operator from the first state to the second state is further defined as rotating the body of the transformable knob about the axis with the operator from the first state to the second state.

In another aspect, flexing the periphery wall of the transformable knob from the first configuration corresponding to the first state to the second configuration corresponding to the second state is further defined as uniformly flexing the periphery wall and increasing the size of the body from the first configuration corresponding to the first state to the second configuration corresponding to the second state.

In another aspect, flexing the periphery wall of the transformable knob from the first configuration corresponding to the first state to the second configuration corresponding to the second state is further defined as flexing the periphery wall and changing a shape of the body from the first configuration corresponding to the first state, to the second configuration corresponding to the second state.

In another aspect, the transformable knob comprises an actuator coupled to the body and movable between a first position and a second position. The method further comprises moving the actuator from the first position to the second position simultaneously with performing the manipulation of the transformable knob with the operator from the first state to the second state and flexing the periphery wall of the transformable knob from the first configuration corresponding to the first state to the second configuration corresponding to the second state.

In another aspect, the transformable knob comprises an actuator movable between a first position and a second position, and an electric motor coupled to the actuator and in electronic communication with the controller. The method further comprises transmitting a configuration signal to the electric motor after comparing the input signal with the processor to the instructions in the at least one non-transitory computer-readable medium and moving the actuator from the first position to the second position simultaneous with flexing the periphery wall of the transformable knob from the first configuration corresponding to the first state to the second configuration corresponding to the second state.

In another aspect, the output device comprises a display surface arranged to show a first indicia and a second indicia. Changing the output device from the first setting to the second setting comprises changing the first indicia being shown on the display screen in the first setting to the second indicia being shown on the display screen in the second setting.

According to several aspects of the present disclosure, a method of operating a control system for a vehicle is presented. The control system comprises a controller comprising at least one processor and at least one non-transitory computer-readable medium including instructions and a transformable knob in electronic communication with the controller, with the transformable knob comprising a body having a periphery wall arranged to flex, an actuator movable between a first position and a second position, and an electric motor coupled to the actuator and in electronic communication with the controller. The control system further comprises an output device in electronic communication with the controller. The method comprises performing a linear movement of the body of the transformable knob along an axis with an operator from a first state to a second state, transmitting an input signal from the transformable knob to the controller, receiving the input signal with the controller, and comparing the input signal with the processor to the instructions in the at least one non-transitory computer-readable medium. The method further comprises transmitting an output signal from the controller to the output device, changing the output device from a first setting to a second setting, transmitting a configuration signal to the electric motor, moving the actuator from the first position to the second position, and simultaneously flexing the periphery wall of the transformable knob from a first configuration corresponding to the first state to a second configuration corresponding to the second state. The method further comprises rotating the body of the transformable knob about the axis with the operator from a first sub-state of the second state to a second sub-state of the second state, transmitting a secondary input signal from the transformable knob to the controller, receiving the secondary input signal with the controller, comparing the secondary input signal with the processor to the instructions in the at least one non-transitory computer-readable medium, transmitting a secondary output signal from the controller to the output device, and changing the output device from a first sub-setting of the second setting to a second sub-setting of the second setting.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2A is a perspective view of one example of a transformable knob comprising a body having a periphery wall configured as a circle.

FIG. 2B is a perspective view of the transformable knob of FIG. 2A, with the periphery wall configured as a decagon.

FIG. 2C is a perspective view of the transformable knob of FIG. 2A, with the periphery wall configured as a square.

FIG. 8A is a cross-sectional view of one example of the transformable knob, showing the plurality of engagement arms configured as a first plurality of plungers and a second plurality of plungers, with the arms disposed in the first position and the periphery wall disposed in the first configuration.

FIG. 8B is a cross-sectional view of the transformable knob of FIG. 8A showing the plurality of engagement arms configured as the first plurality of plungers and the second plurality of plungers, with the arms disposed in the second position and the periphery wall disposed in the second configuration.

FIG. 11A is a cross-sectional view of one example of the transformable knob with the plurality of engagement arms configured as a mechanical iris disposed in the first position and the periphery wall disposed in the first configuration.

FIG. 11B is a cross-sectional view the transformable knob of FIG. 11A with the plurality of engagement arms configured as the mechanical iris disposed in the second position and the periphery wall disposed in the second configuration.

DETAILED DESCRIPTION

The following description is merely exemplary in nature and is not intended to limit the present disclosure, application, or uses.

Figure 12:
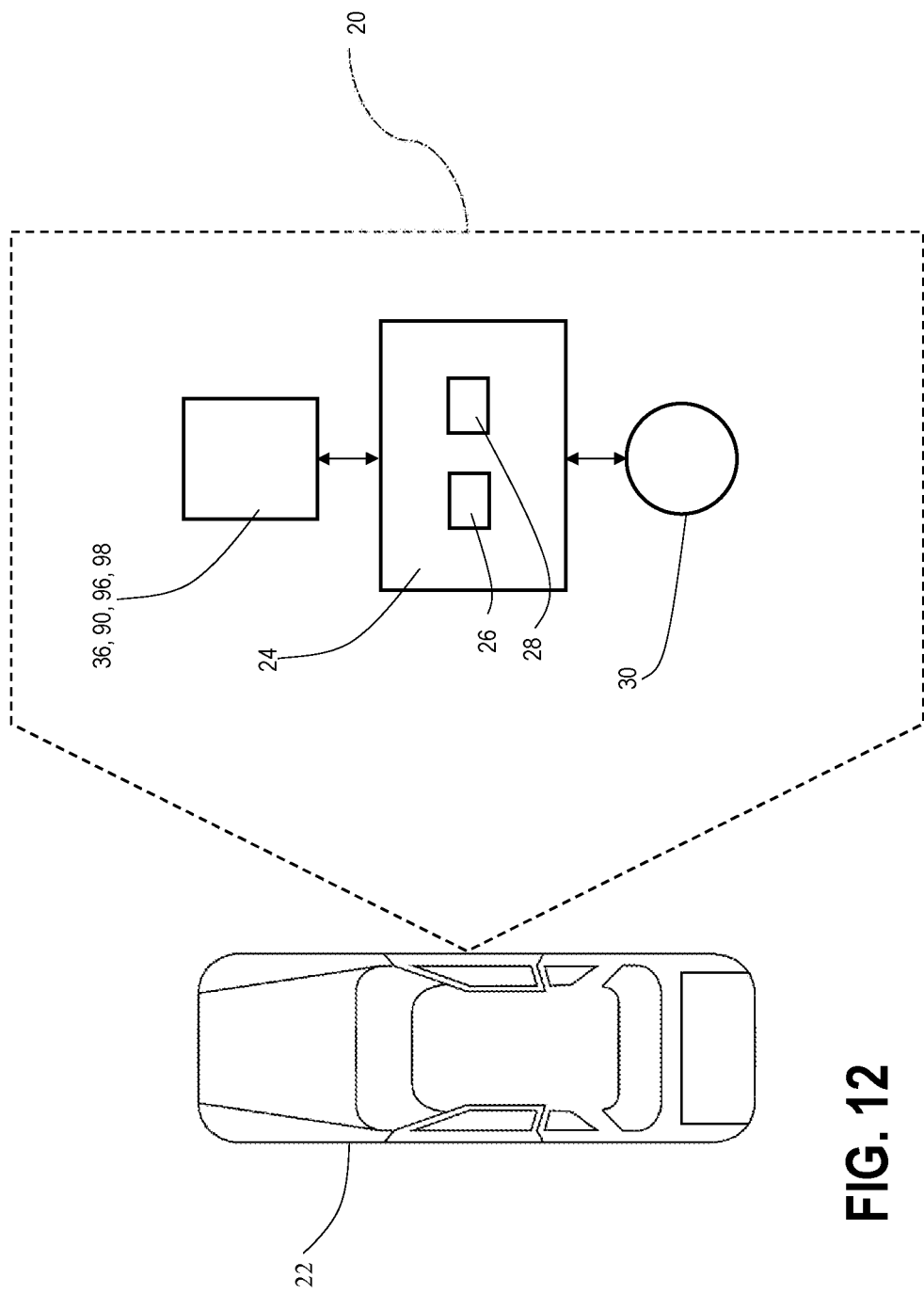
FIG. 12 is a schematic view of one example of a vehicle comprising a control system including the transformable knob, a controller, and an output device.

Referring to FIG. 12, a control system is shown generally at 20. The control system 20 is configured for use with a vehicle 22. The control system 20 comprises a controller 24 comprising at least one processor 26 and at least one non-transitory computer-readable medium 28 including instructions. The at least one non-transitory computer-readable medium 28 may include other data such as control logic, software applications, instructions, computer code, data, lookup tables, etc. A computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. The non-transitory computer readable medium 28 may include media where data can be permanently stored and media where data can be stored and later overwritten, such as a rewritable optical disc or an erasable memory device. Computer code includes any type of program code, including source code, object code, and executable code. The processor 26 is configured to execute the code or instructions.

Figure 1:
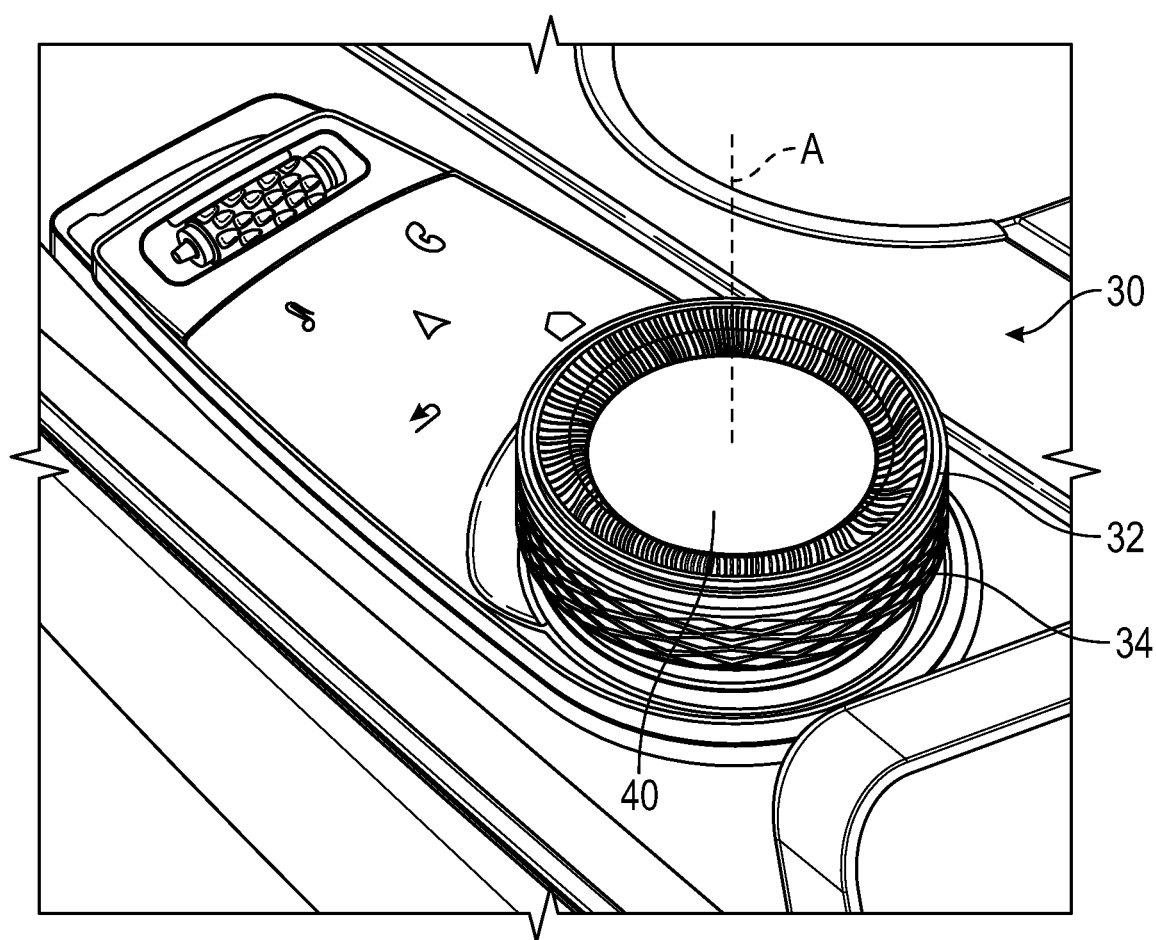
FIG. 1 is a perspective view of one example of a transformable knob of a vehicle.
Figure 3A:
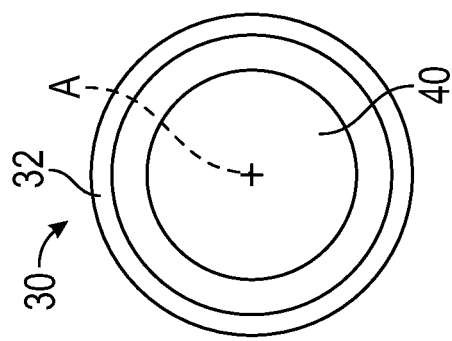
FIG. 3A is a top plan view of the transformable knob of FIG. 2A, with the periphery wall configured as a circle.
Figure 3B:
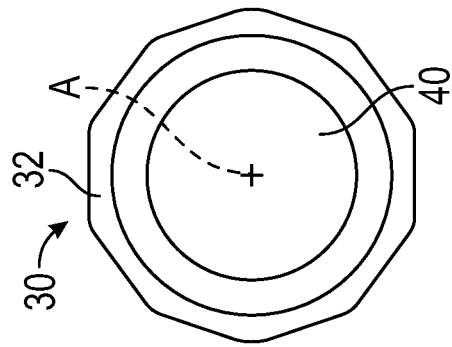
FIG. 3B is a top plan view of the transformable knob of FIG. 2A, with the periphery wall configured as a decagon.
Figure 3C:
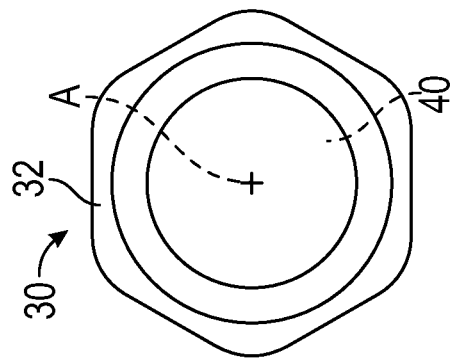
FIG. 3C is a top plan view of the transformable knob of FIG. 2A, with the periphery wall configured as a hexagon.
Figure 3D:
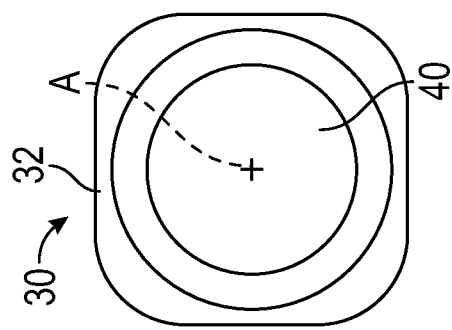
FIG. 3D is a top plan view of the transformable knob of FIG. 2A, with the periphery wall configured as a square.
Figure 3E:
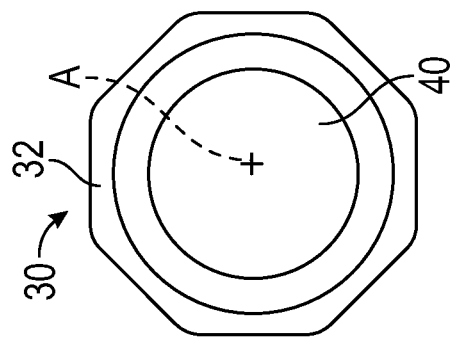
FIG. 3E is a top plan view of the transformable knob of FIG. 2A, with the periphery wall configured as an octagon.

The control system 20 further comprises a transformable knob 30 configured to be manipulated by an operator between a first state and a second state and in electronic communication with the controller 24. As shown in FIG. 1, the transformable knob 30 comprises a body 32 having a periphery wall 34 arranged to flex between a first configuration corresponding to the first state and a second configuration corresponding to the second state. In the example shown in the Figures, the transformable knob 30 is disposed within an interior of the vehicle 22. More specifically, the transformable knob 30 is mounted to a portion of the vehicle 22 that is within reach of the operator of the vehicle 22, such as along a dashboard or a center console of the vehicle 22. However, the transformable knob 30 may be utilized in any suitable location on the vehicle 22.

With reference to FIG. 12, the control system 20 further comprises an output device 36 in electronic communication with the controller 24 and arranged to change between a first setting and a second setting. Manipulation of the transformable knob 30 by the operator from the first state to the second state transmits an input signal to the controller 24 and facilitates flexing of the periphery wall 34 from the first configuration (see FIG. 13A) to the second configuration (see FIG. 13B). The controller 24 is configured to receive the input signal and the processor 26 is programmed to compare the input signal to the instructions in the at least one non-transitory computer-readable medium 28 and transmit an output signal to the output device 36 to change the output device 36 from the first setting (see FIG. 13A) to the second setting (see FIG. 13B).

In one example, flexing the periphery wall 34 between the first and second configurations is further defined as uniformly flexing the periphery wall 34 and increasing the size of the body 32 from the first configuration to the second configuration. In another example, flexing the periphery wall 34 between the first and second configurations is further defined as flexing the periphery wall 34 and changing a shape of the body 32 from the first configuration to the second configuration. The manipulation of the transformable knob 30 causes both the change to the output device 36 and the corresponding change to the configuration of the body 32 of the transformable knob 30 (e.g., the size and/or the shape). As such, the transformable knob 30 functions as both an input from the operator to control the output device 36 as an output from the control system 20 that provides both visual and tactile feedback to the user that confirms the setting of the output device 36. More specifically, the operator may ascertain the setting of the output device 36 from the configuration of the periphery wall 34 of the transformable knob 30. Furthermore, the operator may ascertain the different configurations by touching the periphery wall 34 (i.e., without visually inspecting the transformable knob 30) which prevents the operator from averting their visual attention from the road while operating the vehicle 22. Therefore, the transformable knob 30 promotes safe driving practices.

As shown in FIGS. 4A-11B, the transformable knob 30 comprises an axle 38 extending along an axis A. The body 32 is mounted to the axle 38 and is rotatable about the axis A. The axle 38 is mounted to the vehicle 22 (e.g., dashboard and/or center console in the examples described above). The body 32 comprises a face plate 40 and the periphery wall 34 coupled to the face plate 40 and extending around the axis A, as shown in FIGS. 1-2C. The face plate 40 and the periphery wall 34 define a cavity 42, as shown in FIGS. 4A-11B. The periphery wall 34 arranged to flex relative to the axis A. The transformable knob 30 further comprises a plurality of engagement arms 44 disposed within the cavity 42 and movable toward and away from the axis A, with the plurality of engagement arms 44 configured to selectively engage and flex the periphery wall 34 between a first configuration and a second configuration. The transformable knob 30 further comprises an actuator 46 in engagement with the plurality of engagement arms 44 and arranged to move between a first position and a second position, with movement of the actuator 46 between the first and second positions facilitating corresponding movement of the plurality of engagement arms 44 to flex the periphery wall 34 between the first and second configurations, respectively.

As shown in FIGS. 5, 6, 7, and 9, the actuator 46 may extend along a first plane P1 orthogonal to the axis A and defines a first track 48 extending in a curved radial configuration from the axis A. The plurality of engagement arms 44 comprise a first post 50 disposed in the first track 48. The rotation of the actuator 46 moves the first post 50 within the first track 48 and correspondingly moves the plurality of engagement arms 44 between the first and second positions. The transformable knob 30 may further comprises a guide plate 52 extending along a second plane P2 parallel to the first plane P1, with the plurality of engagement arms 44 disposed between the actuator 46 and the guide plate 52. The guide plate 52 defines a second track 54 extending in a straight radial configuration from the axis A. The plurality of engagement arms 44 comprise a second post 56 disposed in the second track 54. The guide plate 52 is stationary as the actuator 46 moves the engagement arms 44 between the first and second positions to guide the movement of the engagement arms 44 in linearly towards and away from the axis A. More specifically, the straight radial configuration of the second track 54 of the guide plate 52 directs the motion toward and away from the axis A while the curvature of the first track 48 of the actuator 46 converts the rotational motion of the actuator 46 into the linear motion of the arms 44.

The guide plate 52 may be fixed to the body 32 and the guide plate 52 retains the rotational position of the engagement arms 44 relative to the body 32 as the actuator 46 moves the engagement arms 44 between the first and second positions. In the example shown in FIG. 5, the transformable knob 30 further comprises a sleeve 58 fixed to the actuator 46 and rotatably coupled to the body 32, with the sleeve 58 extending along the axis A and with the sleeve 58 surrounding the axle 38 and defining a sleeve track 60 having a helical configuration. The axle 38 comprises a protrusion 62 extending outwardly from the axis A and in engagement with the sleeve track 60 with linear movement of the body 32 along the axis A causing the protrusion 62 to move along the sleeve track 60 and rotate the sleeve 58 to move the actuator 46 between the first and second positions. In the example shown in FIG. 5, the operator pushes the body 32 down toward the vehicle 22. The axle 38 is fixed relative to the vehicle 22 and the axis A. The protrusion 62 slides within the sleeve track 60. Because the sleeve track 60 has a helical configuration and because the axle 38 is fixed to the vehicle 22, the sleeve 58 begins to rotate about the axle 38 as the body 32 moves down. More specifically, the helical configuration induces rotation of the sleeve 58. The sleeve 58 may rotate relative to the body 32, which prevents the body 32 from rotating with the sleeve 58 as the body 32 is pushed down. The sleeve 58 is fixed to the actuator 46. As such, rotation of the sleeve 58 causes rotation of the actuator 46 which moves the engagement arms 44 from the first position to the second position. The transformable knob 30 sends the input signal to the controller 24. The transformable knob 30 may remain in the second state. The transformable knob 30 may return to the first state by the operation of pulling the body 32 up. The transformable knob 30 may also comprise a biasing member 64 abutting the body 32 and configured to bias the body 32 toward the first state. As such, the transformable knob 30 may automatically return to the first state after the operator presses the body 32.

Figure 6:
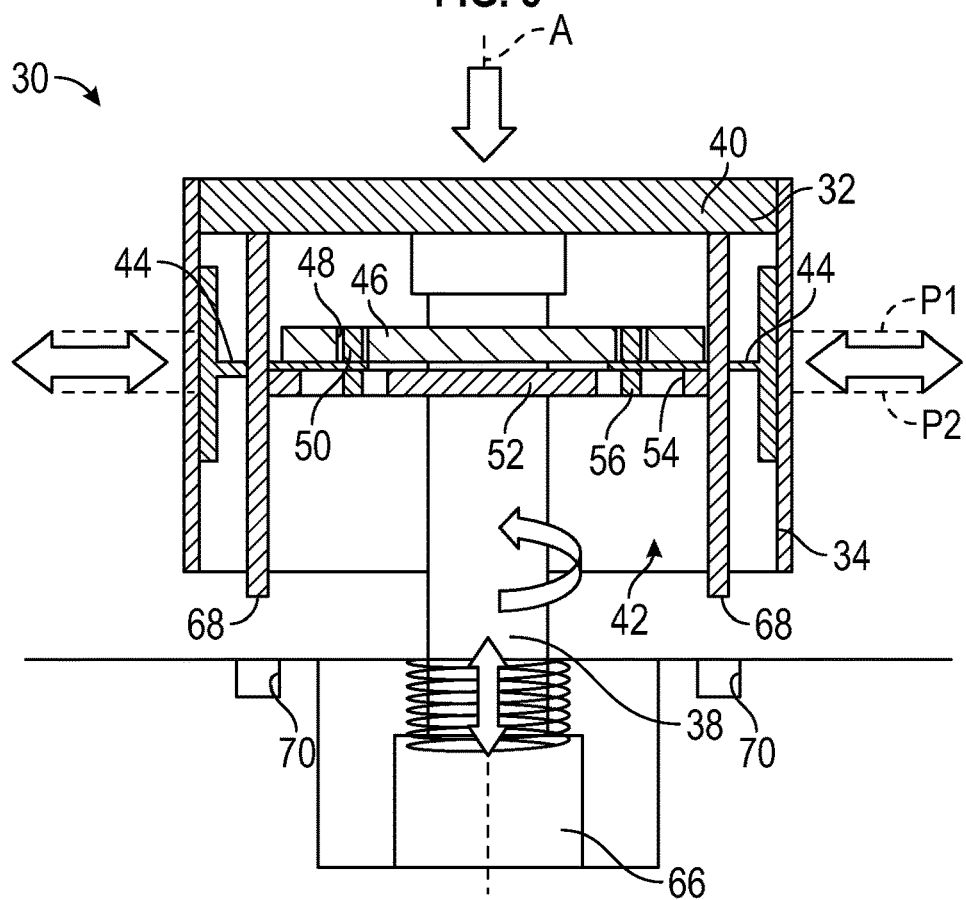
FIG. 6. is a cross-sectional view of one example of the transformable knob, showing an electric motor coupled to the axle.
Figure 7:
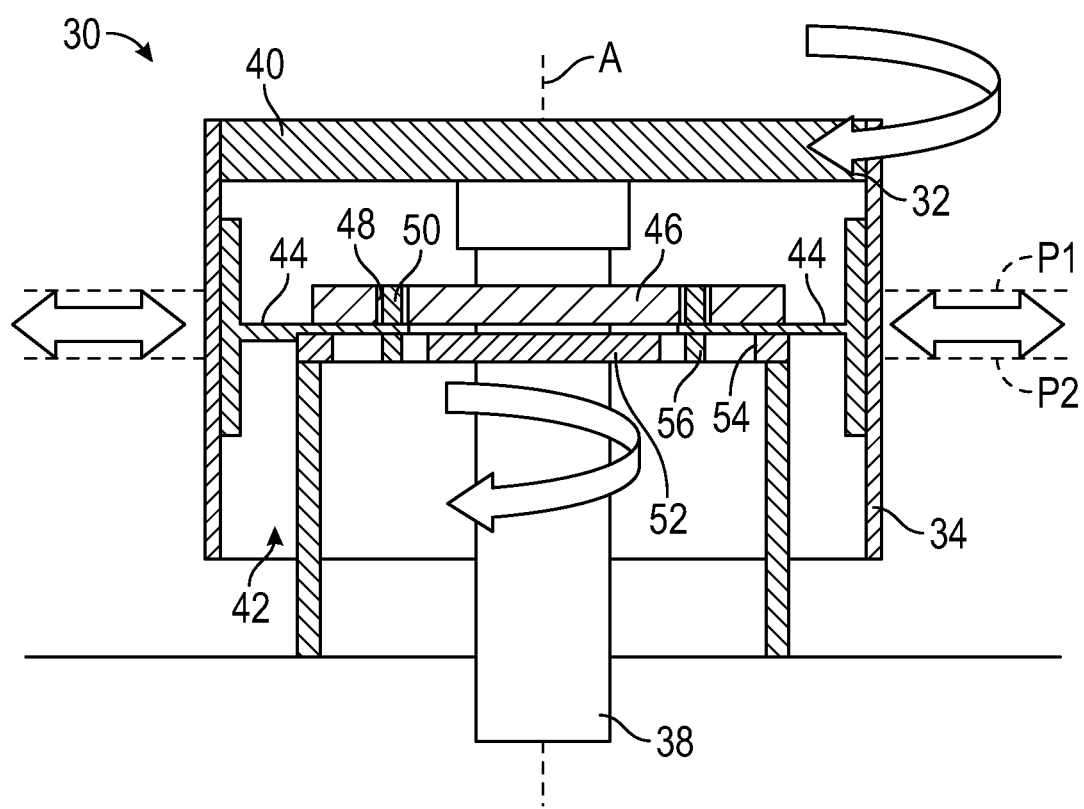
FIG. 7 is a cross-sectional view of one example of the transformable knob, showing the body fixed to the axle and an actuator fixed to the axle.

In the example shown in FIG. 6, the actuator 46 is movable between the first position and the second position (independent of the body 32) and an electric motor 66 is coupled to the actuator 46 and in electronic communication with the controller 24. The processor 26 is further programmed to transmit a configuration signal to the electric motor 66 to move the actuator 46 from the first position to the second position and flex the periphery wall 34 from the first configuration to the second configuration. More specifically, the electric motor 66 is coupled to the axle 38 and configured to rotate the axle 38 about the axis A. The axle 38 is fixed to the actuator 46. Rotation of the axle 38 by the electric motor 66 moves the actuator 46 between the first and second positions. In the example shown in FIG. 6, the operator pushes the body 32 down toward the vehicle 22. The body 32 may comprise an anchor 68 and the vehicle 22 may define a receptacle 70 to receive the anchor 68 and fix the body 32 rotatably about the axis A in the second state. The axle 38 is rotatable about the axis A. The transformable knob 30 sends the input signal to controller 24 and receives the configuration signal in return. The electric motor 66 rotates the axle 38 about the axis A. The axle 38 is fixed to the actuator 46. As such, rotation of the axle 38 causes rotation of the actuator 46 which moves the engagement arms 44 from the first position to the second position. The transformable knob 30 may remain in the second state. The transformable knob 30 may return to the first state by the operation pulling the body 32 up. The transformable knob 30 may also comprise the biasing member 64 abutting the body 32 and configured to bias the body 32 toward the first state. As such, the transformable knob 30 may automatically return to the first state after the operator presses the body 32. When the transformable knob 30 returns to the first state, the engagement arms 44 may remain in the second position as the engagement arms 44 are coupled to electric motor 66 and move independent of the movement of the body 32. However, the engagement arms 44 may return to the first position when the transformable knob 30 returns to the first state.

The guide plate 52 may be fixed relative to the axis A and retains the rotational position of the engagement arms 44 as the body 32 rotates about the axis A. Furthermore, the actuator 46 may be coupled to the body 32 and movable between the first position and the second position, with the manipulation of the transformable knob 30 by the operator from the first state to the second state further defined as movement of the body 32 by the operator from the first state to the second state causing corresponding movement of the actuator 46 from the first position to the second position to flex the periphery wall 34 from the first configuration to the second configuration. In the example shown in FIG. 7, the actuator 46 is fixed to the body 32 such that rotation of the body 32 about the axis A correspondingly moves the actuator 46 between the first and second positions. More specifically, the body 32 is fixed to the axle 38 and the axle 38 is rotatable relative to the vehicle 22. Rotation of the body 32 from the first state to the second state causes the axle 38 to rotate about the axis A. The actuator 46 is fixed to the axle 38. As such, rotation of the axle 38 causes rotation of the actuator 46 which moves the engagement arms 44 from the first position to the second position. The transformable knob 30 may remain in the second state. The transformable knob 30 may return to the first state by the operator rotating the body 32 back to the first state. The transformable knob 30 may also be rotationally biased back toward the first state. As such, the transformable knob 30 may automatically return to the first state after the operator rotates the body 32.

The movement of the plurality of engagement arms 44 to flex the periphery wall 34 between the first and second configurations may be further defined as uniformly moving the plurality of engagement arms 44 outwardly away from the axis A to flex the periphery wall 34 and increase the size of the body 32 from the first configuration to the second configuration (i.e., the size change described above). Alternatively, the movement of the plurality of engagement arms 44 to flex the periphery wall 34 between the first and second configurations is further defined as moving a portion of the plurality of engagement arms 44 toward or away from the axis A to flex the periphery wall 34 and change the shape of the body 32 from the first configuration to the second configuration (i.e., the shape change above).

Figure 4B:
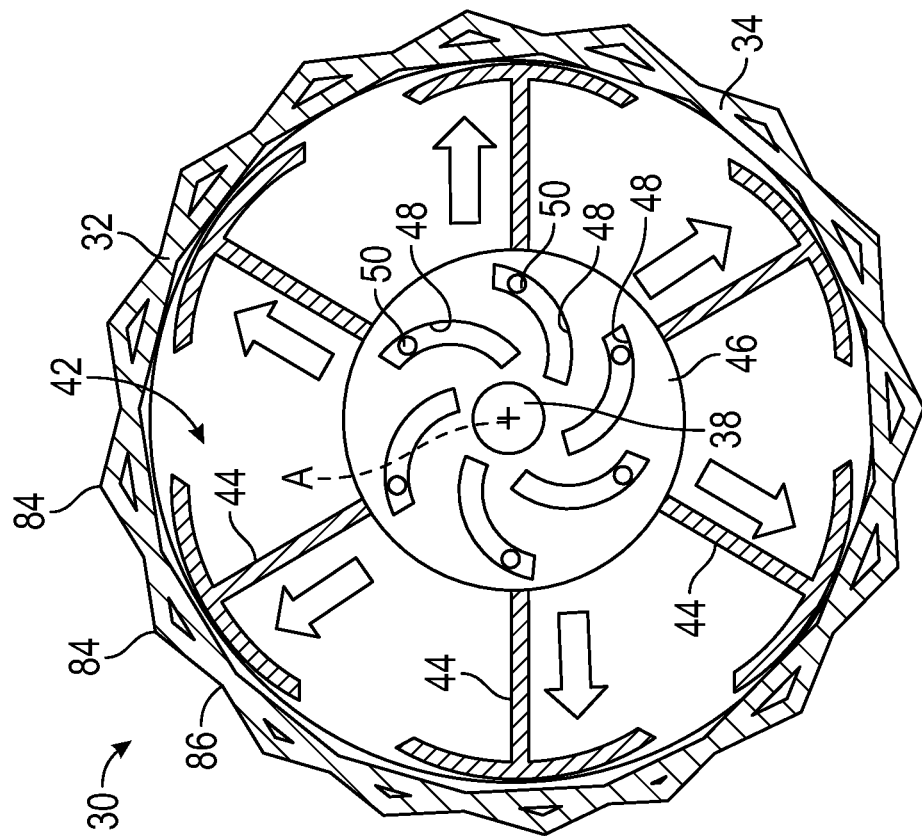
FIG. 4B is a cross-sectional view of the transformable knob of FIG. 4A showing the plurality of engagement arms disposed in a second position and the periphery wall disposed in a second configuration.
Figure 4A:
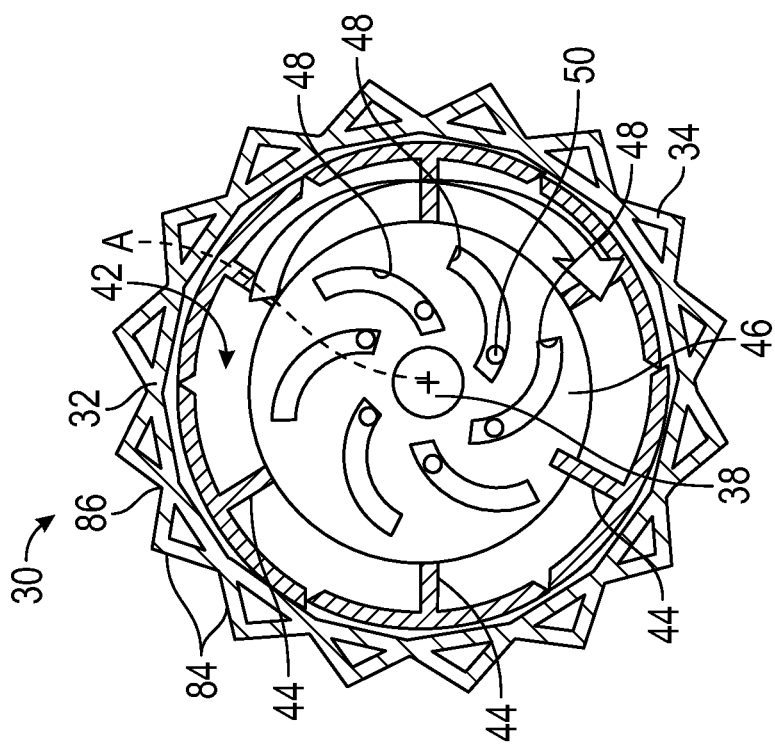
FIG. 4A is a cross-sectional view of one example of the transformable knob showing a plurality of engagement arms disposed in a first position and the periphery wall disposed in a first configuration.
Figure 5:
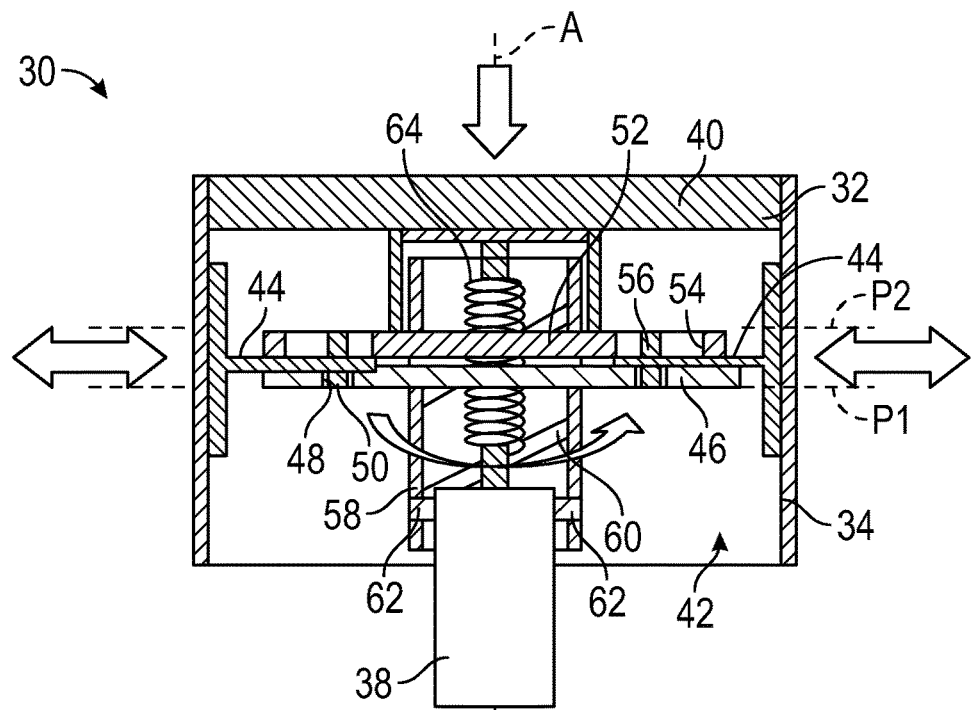
FIG. 5 is a cross-sectional view of one example of the transformable knob, showing an axle and a sleeve in engagement with the axle.

In the examples shown in FIGS. 4A-10, the plurality of engagement arms 44 are configured as a plurality of plungers 72 each individually engaging a portion of the periphery wall 34. Furthermore, each of the plurality of engagement arms 44 may individually comprise the first post 50 and the second. Likewise, the actuator 46 may define numerous first tracks 48 and the guide plate 52 may define numerous second tracks 54. The first posts 50 are individually disposed in the first tracks 48 and the second posts 56 are individually disposed in the second tracks 54. Each of the plungers 72 may comprise a head 74. Each of the heads 74 may have a curved surface 76 configured to engage the respective portion of the periphery wall 34, as shown in FIGS. 4A and 4B. The curved surfaces 76 allow for the formation of shapes with curvatures, rather than only polygons with angular corners. However, some or all of the plungers 72 may comprise heads 74 having flat surfaces 78. In the example shown in FIGS. 8A and 8B, a portion of the plungers 72 have the curved surface 76 and a portion of the plungers 72 have the flat surfaces 78. The combination of curved and flat surfaces 76, 78 allow for various shapes, including polygons and shapes that incorporate curved sides.

Figure 9:
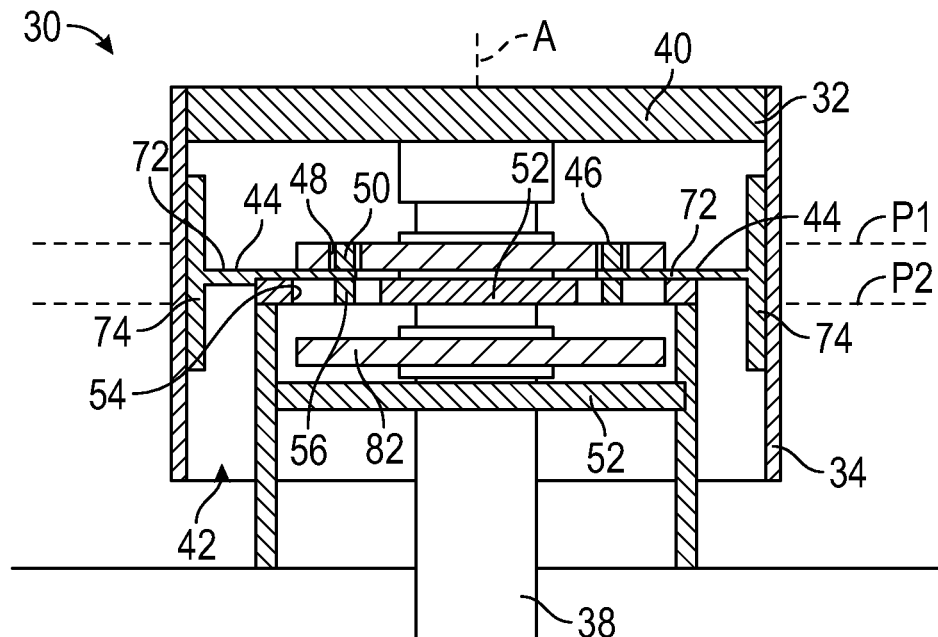
FIG. 9 is a cross-sectional view of the transformable knob of FIG. 8A taken along line 9-9, showing the actuator defined as a first actuator and the first plurality of plungers.
Figure 10:
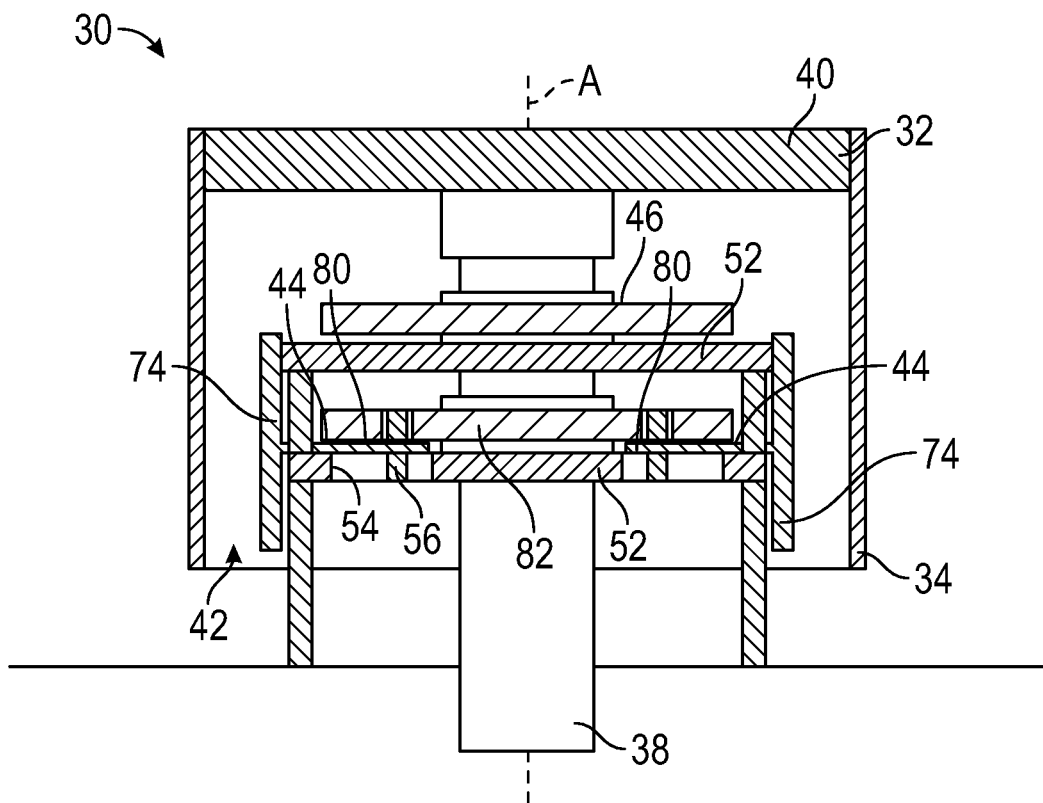
FIG. 10 is a cross-sectional view of the transformable knob of FIG. 8A taken along line 10-10, showing a second actuator and the second plurality of plungers.

As shown in FIGS. 9 and 10, the actuator 46 may be further defined as a first actuator 46 and the plurality of plungers 72 are further defined as a first plurality of plungers 72. The transformable knob 30 may further comprise a second plurality of plungers 80 and a second actuator 82 in engagement with the second plurality of plungers 80, with the second actuator 82 configured to move the second plurality of plungers 80 independent of the first actuator 46 and the first plurality of plungers 72 to change the shape of the body 32 between the first and second configurations. The first plurality of plungers 72 may be radially offset from the second plurality of plungers 80 as shown in FIGS. 8A and 8B, which allows the plungers 72, 80 to press on different portions of the periphery wall 34 at the different states due to the independent movement of the first and second actuators 46, 82. More specifically, the first and second plurality of plungers 72, 80 are disposed in an alternating pattern about the axis A. The first actuator 46 moves the first plurality of plungers 72 outwardly from the axis A when the body 32 is rotated in a first rotational direction about the axis A from the first state to the second state. The second plurality of plungers 80 correspondingly move inwardly toward the axis A when the body 32 is rotated in the first rotational direction. The second actuator 82 moves the second plurality of plungers 80 outwardly from the axis A when the body 32 is rotated in a second rotational direction, opposite the first rotational direction, about the axis A from the second state to the first state. The first plurality of plungers 72 correspondingly move inwardly toward the axis A when the body 32 is rotated in the second rotational direction. As such, the first and second plurality of plungers 72, 80 facilitate flexing the periphery wall 34 into different shapes between the first and second positions.

In the example shown in FIGS. 4A, 4B, 8A, and 8B, the periphery wall 34 comprises a plurality of knurls 84 arranged end-to-end and a plurality of hinges 86 individually disposed between the knurls 84. Flexing the periphery wall 34 comprises folding the knurls 84 about the hinges 86. As such, the knurls 84 allow the periphery wall 34 to fold into different shapes as different engagement arms 44 press on and move the periphery wall 34. The periphery wall 34 may comprise an elastomeric material such that flexing the periphery wall 34 comprises bending the elastomeric material of the periphery wall 34. Furthermore, flexing the periphery wall 34 may comprise stretching the elastomeric material of the periphery wall 34.

In the example shown in FIGS. 11A and 11B, the plurality of engagement arms 44 are substantially flat and overlap one another about the axis A. The engagement arms 44 collectively engage the periphery wall 34 entirely around the axis A. The engagement arms 44 rotate and correspondingly move inwardly or outwardly while in engagement with the periphery wall 34. The rotational movement of the engagement arms 44 flex the periphery wall 34 and change the configuration between the first and second configurations. More specifically, the plurality of engagement arms 44 are configured as a mechanical iris 88. In the example shown in FIGS. 11A and 11B, the mechanical iris 88 changes the size of the periphery wall 34. However, the engagement arms 44 may be positioned such that their rotational movements may facilitate the shape change of the periphery wall 34.

As described above, the manipulation of the transformable knob 30 by the operator from the first state to the second state may be further defined as rotation of the body 32 of the transformable knob 30 about the axis A from the first state to the second state or linear movement of the body 32 of the transformable knob 30 along axis A from the first state to the second state. However, the manipulation of the transformable knob 30 may be further defined as sliding the transformable knob 30 along a surface, tipping the transformable knob 30, etc. Furthermore, the manipulation of the knob 30 may comprise engagement with the transformable knob 30 that does not move the knob 30, such as engaging a touch sensor disposed on the knob 30.

Figure 13B:
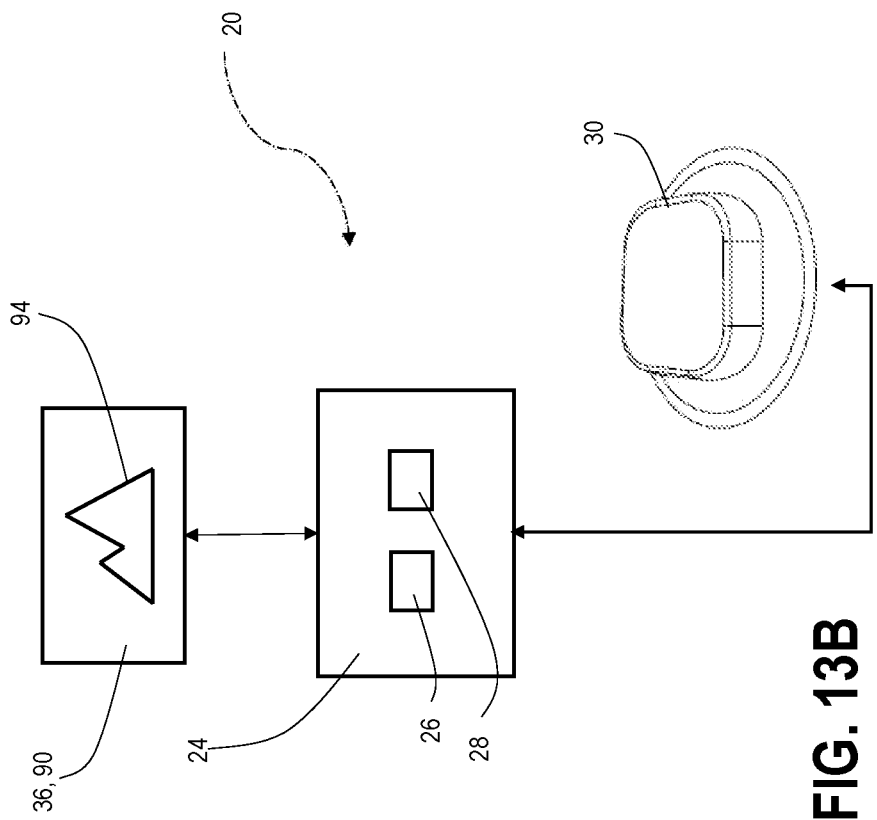
FIG. 13B is a schematic view of the control system of FIG. 13A, with the transformable knob disposed in the second configuration and the output device configured as the display surface and showing a second indicia.
Figure 13A:
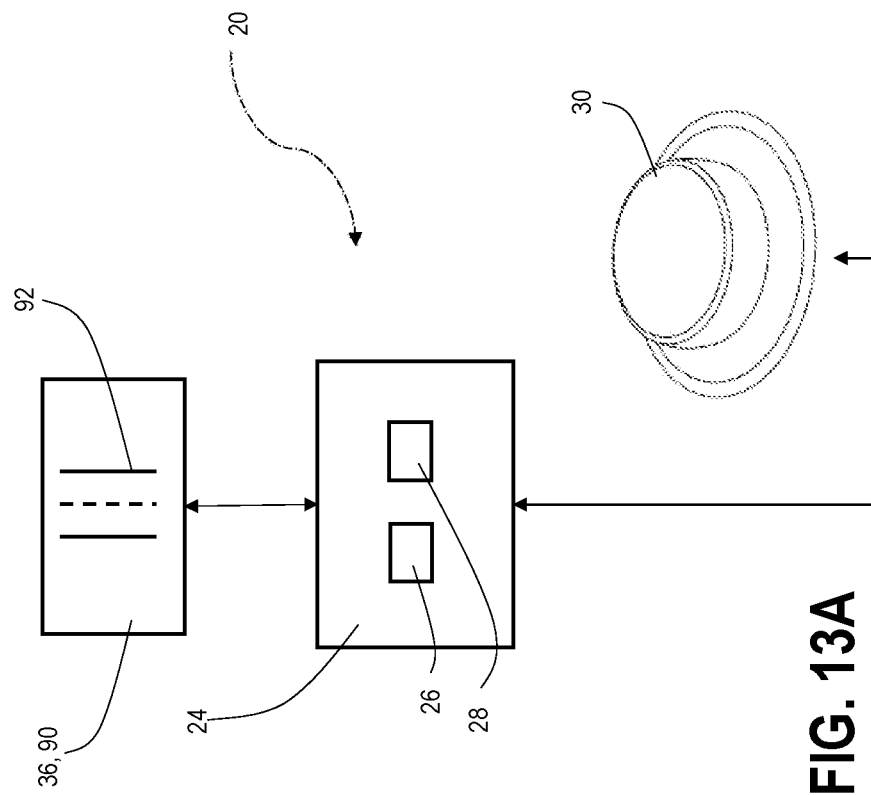
FIG. 13A is a schematic view of one example of control system showing the transformable knob disposed in the first configuration and the output device configured as a display surface and showing a first indicia.

As shown in FIGS. 13A and 13B, the output device 36 may comprise a display surface 90 arranged to show a first indicia 92 and a second indicia 94, with the display surface 90 showing the first indicia 92 in the first setting and the second indicia 94 in the second setting. The display surface 90 may be a screen capable of displaying an image. The first indicia 92 and second indicia 94 may comprise text, an icon, or the like that indicates the disposition of the output device 36 in the first and second settings, respectively.

With reference to FIG. 12, the output device 36 may further comprise a ride control module 96 configured to change dynamics of the vehicle 22 between a first ride mode and a second ride mode, with the first ride mode corresponding to the first setting and the second ride mode corresponding to the second setting. More specifically, the ride control module 96 may control suspension characteristics such as the rate at which shock absorbers dampen the oscillation of the sprung wheels. The ride control module 96 may also control powertrain characteristics, such as the maximum power output of an electric motor at a given moment (in an electric powered vehicle) or the shift points of a transmission (in an internal combustion engine powered vehicle). On the other hand, the output device 36 may further comprise a cabin comfort module 98 configured to change an environment within the vehicle 22 between a first comfort mode and a second comfort mode, with the first comfort mode corresponding to the first setting and a second comfort mode corresponding to the second setting. More specifically, the cabin comfort module 98 may control the radio, the HVAC, and other systems that alter the environment within the vehicle 22.

The terms "first" and "second" above in association with states, positions, configurations, settings, etc. are relative and do not signify any importance or order. Furthermore, although the transformable knob 30 is described above as being manipulated between two states which cause the periphery wall 34 to change between two configurations and the output device 36 to change between two settings, this is for exemplary purposes. It is to be appreciated that the transformable knob 30 may be the control system 20 may be configured for use with a plurality of states, configurations, settings, etc. As a non-limiting example, the ride control module 96 may change between five ride control modes, including a tour mode, a sport mode, a track mode, an off-road mode, and an operator configurable mode. As such, the transformable knob 30 may be manipulated between five states which cause the periphery wall 34 to change between five configurations. The configurations may each have a different shape, as shown in FIGS. 2A-3E. Likewise, the cabin comfort module 98 may change between five comfort modes, including a volume mode, a tune mode, a temperature mode, a fan speed mode, and a fan location mode. As such, the transformable knob 30 may be manipulated between five states which cause the periphery wall 34 to change between five configurations. The configurations may each have a different shape (reference again to FIGS. 2A-3E).

The manipulation of the transformable knob 30 with the operator from the first state to the second state may be further defined as a primary manipulation of the transformable knob 30 with the operator from the first state to the second state. The operator may further perform a secondary manipulation of the transformable knob 30 from a first sub-state of the second state to a second sub-state of the second state, which transmits a secondary input signal from the transformable knob 30 to the controller 24. The processor 26 then compares the secondary input signal to the instructions in the at least one non-transitory computer-readable medium 28 and transmits a secondary output signal from the controller 24 to the output device 36, which changes the output device 36 from a first sub-setting of the second setting to a second sub-setting of the second setting. The changing of the output device 36 between the settings and the sub-settings is referred to as multi-function control. The changing of the output device 36 between only the settings is referred to as dedicated control.

The example above pertaining to the ride control module 96 is an example of a dedicated control. The transformable knob 30 may be manipulated to change the ride control module 96 between the five ride control modes. However, there are no sub-settings of the ride control modes that can be changed through a secondary manipulation of the transformable knob 30. In this example, the operator changes the ride control mode by rotating the body 32 of the transformable knob 30 between five states that correspond with the five rode control modes. However, the transformable knob 30 could be configured to change between the states by linearly moving (i.e., pressing) the body 32.

The example above pertaining to the cabin comfort module 98 is an example of a multi-function control. The transformable knob 30 may undergo a primary manipulation to change the cabin comfort module 98 between the five comfort modes. The transformable knob 30 may also undergo a secondary manipulation to change the cabin comfort module 98 between at least two sub-settings for a selected comfort mode. The sub-settings may include the volume level for the volume comfort mode, the temperature level for the temperature comfort level, the speed at which the fan rotates for the fan speed comfort mode, etc. In this example, the operator changes the comfort mode by rotating the body 32 of the transformable knob 30 between five states that correspond with the five comfort modes. The operator may change sub-setting for a selected comfort move by linearly moving (i.e., pressing) the body 32. However, the opposite may be true (i.e., the knob 30 may be linearly moved to change between the comfort modes and rotated to change between the sub-settings).

Figure 14:
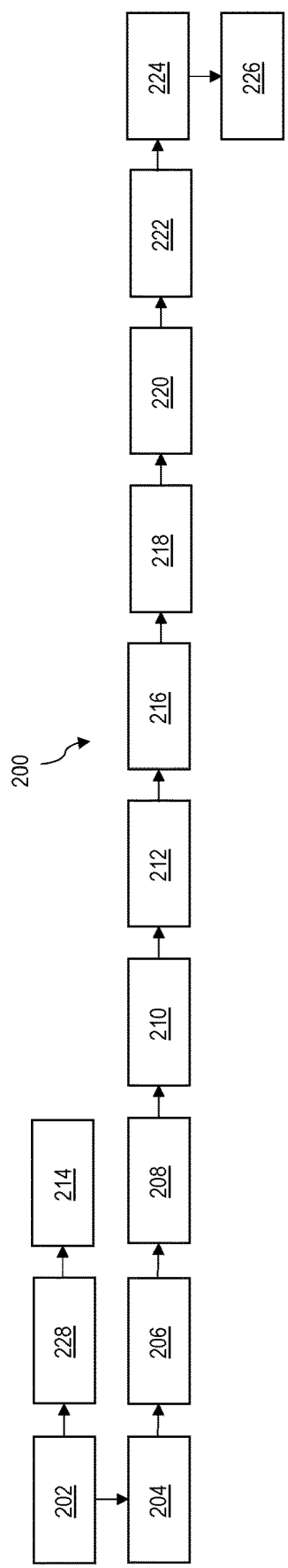
FIG. 14 is a is a flow chart showing one example of a method of operating the control system.
Figure 15:
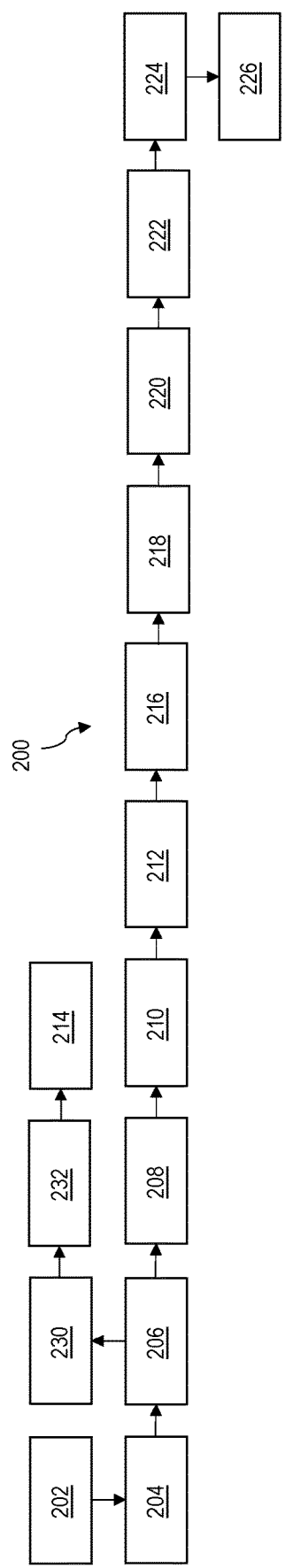
FIG. 15 is a is a flow chart showing another example of a method of operating the control system.

A method 200 of operating the control system 20 is also disclosed herein and shown in FIGS. 14 and 15. The method comprises performing the manipulation of the transformable knob 30 with the operator from the first state to the second state (see box 202), transmitting the input signal from the transformable knob 30 to the controller 24 (see box 204), receiving the input signal with the controller 24 (see box 206), and comparing the input signal with the processor 26 to the instructions in the at least one non-transitory computer-readable medium 28 (see box 208). The method further comprises transmitting the output signal from the controller 24 to the output device 36 (see box 210), changing the output device 36 from the first setting to the second setting (see box 212), and flexing the periphery wall 34 of the transformable knob 30 from the first configuration corresponding to the first state to the second configuration corresponding to the second state (see box 214).

In one example, performing the manipulation of the transformable knob 30 with the operator from the first state to the second state (see box 202) is further defined as rotating the body 32 of the transformable knob 30 about the axis A with the operator from the first state to the second state. In another example, performing the manipulation of the transformable knob 30 with the operator from the first state to the second state (see box 202) is further defined as performing the linear movement of the body 32 of the transformable knob 30 along the axis A with the operator from the first state to the second state Performing the manipulation of the transformable knob 30 with the operator from the first state to the second state (see box 202) may be further defined as performing the primary manipulation of the transformable knob 30 with the operator from the first state to the second state. The method further comprises performing the secondary manipulation of the transformable knob 30 with the operator from the first sub-state of the second state to the second sub-state of the second state (see box 216), transmitting the secondary input signal from the transformable knob 30 to the controller 24 (see box 218), and receiving the secondary input signal with the controller 24 (see box 220). The method further comprises comparing the secondary input signal with the processor 26 to the instructions in the at least one non-transitory computer-readable medium 28 (see box 222), transmitting the secondary output signal from the controller 24 to the output device 36 (see box 224), and changing the output device 36 from the first sub-setting of the second setting to the second sub-setting of the second setting (see box 226). With reference to box 202, performing the primary manipulation of the transformable knob 30 with the operator from the first state to the second state may be further defined as performing the linear movement of the body 32 of the transformable knob 30 along the axis A with the operator from the first state to the second state. With reference to box 216, performing the secondary manipulation of the transformable knob 30 with the operator from the first sub-state of the second state to the second sub-state of the second state may be further defined as rotating the body 32 of the transformable knob 30 about the axis A with the operator from the first sub-state of the second state to the second sub-state of the second state.

In one example, flexing the periphery wall 34 of the transformable knob 30 from the first configuration corresponding to the first state to the second configuration corresponding to the second state (see box 214) is further defined as uniformly flexing the periphery wall 34 and increasing the size of the body 32 from the first configuration corresponding to the first state to the second configuration corresponding to the second state. In another example, flexing the periphery wall 34 of the transformable knob 30 from the first configuration corresponding to the first state to the second configuration corresponding to the second state (see box 214) is further defined as flexing the periphery wall 34 and changing the shape of the body 32 from the first configuration corresponding to the first state, to the second configuration corresponding to the second state.

As shown in FIG. 14, the method may further comprise moving the actuator 46 from the first position to the second position (see box 228) simultaneously with performing the manipulation of the transformable knob 30 with the operator from the first state to the second state (see box 202) and flexing the periphery wall 34 of the transformable knob 30 from the first configuration corresponding to the first state to the second configuration corresponding to the second state (see box 214). Alternatively (and with reference to FIG. 15), the method may further comprise transmitting the configuration signal to the electric motor 66 (see box 230) after comparing the input signal with the processor 26 to the instructions in the at least one non-transitory computer-readable medium 28 (see box 208) and moving the actuator 46 from the first position to the second position (see box 232) simultaneous with flexing the periphery wall 34 of the transformable knob 30 from the first configuration corresponding to the first state to the second configuration corresponding to the second state (see box 214).

As described above, the output device 36 may comprise the display surface 90 arranged to show the first indicia 92 and the second indicia 94. As such, changing the output device 36 from the first setting to the second setting (see box 212) may comprise changing the first indicia 92 being shown on the display screen in the first setting to the second indicia 94 being shown on the display screen in the second setting.

Accordingly, the transformable knob 30 offers several advantages. The transformable knob 30 functions as a physical control, with the change in size and/or shape providing tactile feedback and clear confirmation to operator of selections, which helps to maintain the operator's attention on the road. The change in size and/or shape further enhances the usability and performance of the control system 20 and provide for user personalization and comfort. The transformable knob 30 further reinforces the user experience during driving scenarios by providing a more intuitive interaction with the control system 20.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A transformable knob for a vehicle comprising:
    an axle extending along an axis;
    a body mounted to the axle and rotatable about the axis, with the body comprising a face plate and a periphery wall coupled to the face plate and extending around the axis, with the face plate and the periphery wall defining a cavity, and with the periphery wall arranged to flex relative to the axis;
    a plurality of engagement arms disposed within the cavity and movable toward and away from the axis, with the plurality of engagement arms configured to selectively engage and flex the periphery wall between a first configuration and a second configuration; and
    an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively.

2. The transformable knob of claim 1, wherein the actuator extends along a first plane orthogonal to the axis and defines a first track extending in a curved radial configuration from the axis, wherein the plurality of engagement arms comprise a first post disposed in the first track, wherein rotation of actuator moves the first post within the first track and correspondingly moves the plurality of engagement arms between the first and second positions.

3. The transformable knob of claim 2, further comprising a guide plate extending along a second plane parallel to the first plane, with the plurality of engagement arms disposed between the actuator and the guide plate, wherein the guide plate defines a second track extending in a straight radial configuration from the axis, wherein the plurality of engagement arms comprise a second post disposed in the second track, and wherein the guide plate is stationary as the actuator moves the engagement arms between the first and second positions to guide the movement of the engagement arms in linearly towards and away from the axis.

4. The transformable knob of claim 3, wherein the guide plate is fixed to the body and the guide plate retains the rotational position of the engagement arms relative to the body as the actuator moves the engagement arms between the first and second positions.

5. The transformable knob of claim 4, further comprising a sleeve fixed to the actuator and rotatably coupled to the body, with the sleeve extending along the axis and with the sleeve surrounding the axle and defining a sleeve track having a helical configuration, wherein the axle comprises a protrusion extending outwardly from the axis and in engagement with the sleeve track with linear movement of the body along the axis causing the protrusion to move along the sleeve track and rotate the sleeve to move the actuator between the first and second positions.

6. The transformable knob of claim 4, further comprising an electric motor coupled to the axle and configured to rotate the axle about the axis, and with the axle fixed to the actuator, wherein rotation of the axle by the electric motor moves the actuator between the first and second positions.

7. The transformable knob of claim 3, wherein the guide plate is fixed relative to the axis and retains the rotational position of the engagement arms as the body rotates about the axis.

8. The transformable knob of claim 7, wherein the actuator is fixed to the body such that rotation of the body about the axis correspondingly moves the actuator between the first and second positions.

9. The transformable knob of claim 1, wherein the movement of the plurality of engagement arms to flex the periphery wall between the first and second configurations is further defined as uniformly moving the plurality of engagement arms outwardly away from the axis to flex the periphery wall and increase the size of the body from the first configuration to the second configuration.

10. The transformable knob of claim 1, wherein the movement of the plurality of engagement arms to flex the periphery wall between the first and second configurations is further defined as moving a portion of the plurality of engagement arms toward or away from the axis to flex the periphery wall and change a shape of the body from the first configuration to the second configuration.

11. The transformable knob of claim 1, wherein the plurality of engagement arms are configured as plurality of plungers each individually engaging a portion of the periphery wall.

12. The transformable knob of claim 11, wherein each of the plungers comprise a head having a curved surface configured to engage the respective portion of the periphery wall.

13. The transformable knob of claim 12, wherein the actuator is further defined as a first actuator and the plurality of plungers are further defined as a first plurality of plungers, and further comprising a second plurality of plungers and a second actuator in engagement with the second plurality of plungers, with the second actuator configured to move the second plurality of plungers independent of the first actuator and the first plurality of plungers to change the shape of the body between the first and second configurations.

14. The transformable knob of claim 1, wherein the periphery wall comprises a plurality of knurls arranged end-to-end and a plurality of hinges individually disposed between the knurls and wherein flexing the periphery wall comprises folding the knurls about the hinges.

15. The transformable knob of claim 1, wherein the periphery wall comprises an elastomeric material such that flexing the periphery wall comprises bending the elastomeric material of the periphery wall.

16. The transformable knob of claim 15, wherein flexing the periphery wall comprises stretching the elastomeric material of the periphery wall.

17. The transformable knob of claim 1, wherein the plurality of engagement arms are substantially flat and overlap one another about the axis such that the engagement arms collectively engage the periphery wall entirely around the axis.

18. The transformable knob of claim 17, wherein the plurality of engagement arms are configured as a mechanical iris.

19. A transformable knob for a vehicle comprising:
an axle extending along an axis;
a body mounted to the axle and rotatable about the axis, with the body comprising a face plate and a periphery wall coupled to the face plate and extending around the axis, with the face plate and the periphery wall defining a cavity, and with the periphery wall arranged to flex relative to the axis;
a plurality of engagement arms disposed within the cavity and movable toward and away from the axis, with the plurality of engagement arms configured to selectively engage and flex the periphery wall between a first configuration and a second configuration;
an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively; and
a guide plate;
wherein the actuator extends along a first plane orthogonal to the axis and defines a first track extending in a curved radial configuration from the axis, wherein the plurality of engagement arms comprise a first post disposed in the first track, wherein rotation of actuator moves the first post within the first track and correspondingly moves the plurality of engagement arms between the first and second positions;
wherein the guide plate extends along a second plane parallel to the first plane, with the plurality of engagement arms disposed between the actuator and the guide plate, wherein the guide plate defines a second track extending in a straight radial configuration from the axis, wherein the plurality of engagement arms comprise a second post disposed in the second track, and wherein the guide plate is stationary as the actuator moves the engagement arms between the first and second positions to guide the movement of the engagement arms in linearly towards and away from the axis;

wherein the guide plate is fixed relative to the axis and retains the rotational position of the engagement arms as the body rotates about the axis;
wherein the actuator is fixed to the body such that rotation of the body about the axis correspondingly moves the actuator between the first and second positions;
wherein the plurality of engagement arms are configured as plurality of plungers each individually engaging a portion of the periphery wall; and
wherein the actuator is further defined as a first actuator and the plurality of plungers are further defined as a first plurality of plungers, and further comprising a second plurality of plungers and a second actuator in engagement with the second plurality of plungers, with the second actuator configured to move the second plurality of plungers independent of the first actuator and the first plurality of plungers to change the shape of the body between the first and second configurations.

20. A transformable knob for a vehicle comprising:
an axle extending along an axis;
a body mounted to the axle and rotatable about the axis, with the body comprising a face plate and a periphery wall coupled to the face plate and extending around the axis, with the face plate and the periphery wall defining a cavity, and with the periphery wall arranged to flex relative to the axis;
a plurality of engagement arms disposed within the cavity and movable toward and away from the axis, with the plurality of engagement arms configured to selectively engage and flex the periphery wall between a first configuration and a second configuration;
an actuator in engagement with the plurality of engagement arms and arranged to move between a first position and a second position, with movement of the actuator between the first and second positions facilitating corresponding movement of the plurality of engagement arms to flex the periphery wall between the first and second configurations, respectively;
a guide plate; and
an electric motor coupled to the axle and configured to rotate the axle about the axis;
wherein the plurality of engagement arms are configured as plurality of plungers each individually engaging a portion of the periphery wall;
wherein the actuator extends along a first plane orthogonal to the axis and defines a first track extending in a curved radial configuration from the axis, wherein the plurality of engagement arms comprise a first post disposed in the first track, wherein rotation of actuator moves the first post within the first track and correspondingly moves the plurality of engagement arms between the first and second positions;
wherein the guide plate extends along a second plane parallel to the first plane, with the plurality of engagement arms disposed between the actuator and the guide plate, wherein the guide plate defines a second track extending in a straight radial configuration from the axis, wherein the plurality of engagement arms comprise a second post disposed in the second track, and wherein the guide plate is stationary as the actuator moves the engagement arms between the first and second positions to guide the movement of the engagement arms in linearly towards and away from the axis;
wherein the guide plate is fixed to the body and the guide plate retains the rotational position of the engagement arms relative to the body as the actuator moves the engagement arms between the first and second positions;

wherein the axle is fixed to the actuator; and wherein rotation of the axle by the electric motor moves the actuator between the first and second positions.

\* \* \* \* \*